United States Patent [19]
Hearn

[11] 3,775,059
[45] Nov. 27, 1973

[54] TRACE OIL ANALYSIS
[75] Inventor: Lerma L. E. Hearn, Tulsa, Okla.
[73] Assignee: Fram Corporation, East Providence, R.I.
[22] Filed: Nov. 24, 1971
[21] Appl. No.: 201,943

[52] U.S. Cl. ........................................... 23/230 HC
[51] Int. Cl. .......................................... G01n 33/18
[58] Field of Search ............................... 23/230 HC

[56] References Cited
UNITED STATES PATENTS
270,489 1/1883 Schubert .................... 23/230 HC X
3,074,982 1/1963 Anderson et al. ............. 23/253 R X Primary Examiner—Robert M. Reese
Attorney—Robert E. Hillman

[57] ABSTRACT

Trace concentrations of oil are measured by mixing the sample with an emulsifier to distribute the oil uniformly throughout the sample, transferring a measured portion of the emulsified sample to a reservoir of a bottle having a capillary neck, equilibrating the temperature of the sample portion to over 135° F, adding a demulsifier to the bottle, while keeping the liquid level therein below the neck, whirling the bottle in a heated centrifuge to separate out the oil, adding liquid to the bottle to raise the liquid level to form a column of separated oil wholly within the neck, equilibrating the temperature of the contents of the bottle, and measuring the length of the column of oil.

18 Claims, 2 Drawing Figures

PATENTED NOV 27 1973
3,775,059
FIG 1
FIG 2
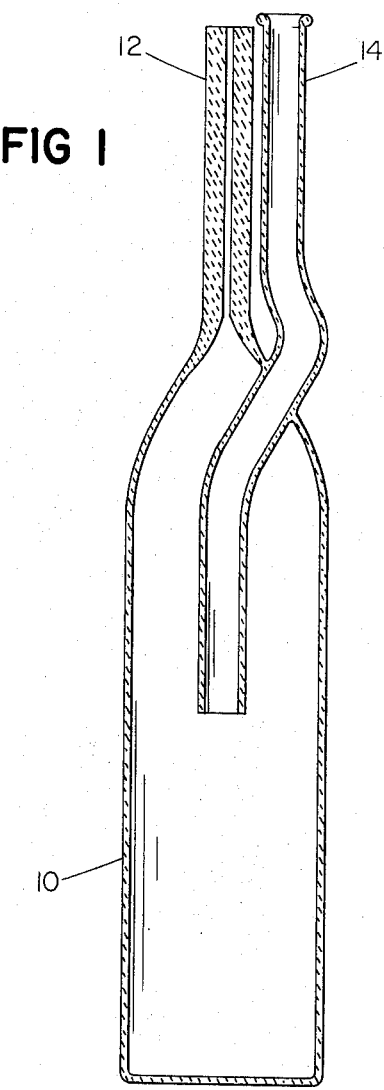
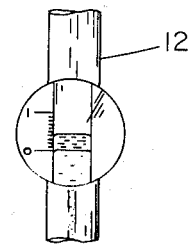

TRACE OIL ANALYSIS

BACKGROUND OF THE INVENTION

1. Field of the Invention

This invention relates to measurement of trace quantities (concentrations no greater than 2,000 ppm and as low as, e.g., 5 ppm) of oil in water.

2. Description of the Prior Art

Prior methods of trace oil analysis typically involve extraction of the oil with a volatile solvent and, after evaporation of the solvent, measurement of the residue by weight or volume. Solvent extraction methods are time consuming, and inaccuracies can be introduced, e.g., by loss of oil upon transfer between containers or by the extraction with the oil of salts present in the water.

In contexts other than trace oil analysis gross quantities of fats and oils have been measured by using centrifugal separation to produce an oil column in the calibrated neck of a bottle. E.g., Babcock bottles are used to determine the fat content of milk by mixture of a sample with sulfuric acid, followed by centrifuging (see Jacobs, *The Chemical Analysis of Foods and Food Products*, Van Nostrand, 1958, p. 267); and sulfonation bottles are used to measure unsulfonated residues in petroleum plant spray oils. However, methods of this general sort have, prior to the present invention, been considered insufficiently accurate (cf. U.S. Pat. No. 3,074,982) for trace oil analysis, and efforts to use Babcock bottles for such analysis have been unsuccessful.

SUMMARY OF THE INVENTION

The present invention successfully applies centrifugal separation techniques to trace oil analysis, and provides a test which can simply and quickly be carried out by technicians, with great accuracy, and at low cost, without having to handle toxic, flammable, or volatile liquids.

In general the invention features providing an aqueous sample containing oil in concentration no greater than 2,000 ppm, mixing the sample with an emulsifier to distribute the oil uniformly throughout the sample, transferring a measured portion of the emulsified sample to a reservoir of a bottle having a capillary neck, equilibrating the temperature of the sample portion to over 135° F, adding a demulsifier to the bottle, while keeping the liquid level therein below the neck, whirling the bottle in a heated centrifuge to separate out the oil, adding liquid to the bottle to raise the liquid level to form a column of separated oil wholly within the neck, equilibrating the temperature of the contents of the bottle, and measuring the length of the column of oil. In preferred embodiments the temperature equilibration steps are carried out in a constant temperature bath at at least 150° F.; the demulsifier is added in at least three portions with the contents of the bottle being mixed between additions; the bottle is whirled in the centrifuge after the column is formed in the neck; the capillary neck has an I.D. between 0.5 mm. and 1.5 mm. and a volumetric capacity less than one thousandth that of the reservoir; the emulsifier includes a polyethoxylated linear alcohol of the general formula RO-$(CH_2$-$CH_2O)_n$-H where $n$ is between 3 and 7, inclusive; the emulsifier in some embodiments also includes an alkyl or polyalkyl benzene sulfonate or an alkyl or polyalkyl naphthalene sulfonate, where the alkyl or polyalkyl group contains 8 to 24 carbon atoms, and sodium dioctyl sulfosuccinate, the sulfonate being present in volume 2 to 7 times that of the alcohol; and the demulsifier comprises a sodium salt of a polybasic acid, preferably sodium dichromate or sodium citrate and a pH indicator chosen to give a color change in the pH8–pH9 range.

Other advantages and features of the invention will be apparent from the description and drawings herein of a preferred embodiment thereof.

BRIEF DESCRIPTION OF THE DRAWINGS

FIG. 1 is vertical sectional view, full size, of a trace oil analysis bottle; and FIG. 2 is a fragmentary enlargement of the capillary neck of the bottle of FIG. 1, showing a column of oil to be measured.

DESCRIPTION OF THE PREFERRED EMBODIMENT

At least 125 ml. of representative sample of an aqueous system having trace quantities (no greater than 2,000 ppm) of petroleum or other oil is placed in a clean, oil free container to which has been added an emulsifier.

The purpose of the emulsifier is to distribute the suspected oil as uniformly as possible throughout the sample. The choice of emulsifier should be guided generally by the HLB (hydrophile-lipophile number, a conventional measure of the solubility of a surfactant in the suspected oil relative to its solubility in water, high HLB corresponding to relatively high solubility in water) requirement of the suspected oil. The preferred emulsifiers of the invention are based upon polyethoxylated linear alcohols having the general formula RO-$(CH_2$-$CH_2O)_n$-H, where R is either an alkyl radical having from 6 to 20 carbon atoms (preferably 11 to 15 carbon atoms), or an alkyl phenyl radical in which the alkyl radical contains 7 to 12 carbon atoms, and $n$ is between 3 and 7, inclusive (preferably 3 or 5). Where the suspected oil has a medium to high HLB requirement (12 or more), the alcohol should be mixed with an alkyl (or polyalkyl) benzene (or naphthalene) sulfonate, the alkyl or polyalkyl group containing 8 to 24 carbon atoms. The sulfonate should be used in amount (by volume) ranging from zero to 9 times (preferably 2 to 7 times) that of the alcohol. Preferably (except where HLB requirements are low) there is also added up to 30 parts of sodium dioctyl sulfosuccinate, to further enhance the emulsifying efficiency of the alcohol-sulfonate mixture. The following table shows three examples of preferred emulsifiers, in which the alcohol used is sold by Union Carbide Corporation under trade name Tergitol 15-S-5 and 15-S-3; the sulfonate is sold by Arco Chemical Co. (division of Atlantic Richfield Co.) under the trade name Arco C Base Surfactant (70% active blend), and the sulfosuccinate is sold by America Cyanamide Company, Industrial Chemicals & Plastic Division under the trade name Aerosol O-T (25% aqueous solution).

TABLE I

| Emulsifier | Alcohol | Sulfonate | Sulfosuccinate |
|---|---|---|---|
| 1 | one part 15-S-5 | 3.14 parts | 109 parts |
| 2 | one part 15-S-5 | 5.2 parts | 109 parts |
| 3 | one part 15-S-3 | — | — |

Each emulsifier is used in further diluted aqueous solution. Thus, a 3.35% solution of emulsifier No.1 was used at the rate of 0.2 ml./100 ml. sample for each suspected 125 ppm oil; No. 2 was used in 12.4% solution at the rate of 0.1 ml./100 ml. sample for each 100 ppm oil; No. 3 was used in 1% solution at the rate of 0.2 ml./100 ml. sample for each 100 ppm oil. Emulsifier No. 1 is particularly useful for common oils with HLB requirements in 12-15 range. For higher HLB requirements, as in some crude oils, No. 2, with its higher concentration of sulfonates is best. For low HLB requirement (e.g. artificial oils such as tri-aryl phosphate, or silicone or turbine oils) No. 3 is best.

The sample is immediately mixed thoroughly with the emulsifier by agitation to provide uniform dispersion of the oil. A measured volume (preferably 40 ml.) of the emulsified sample is then transferred to the glass analysis bottle shown in FIG. 1.

The bottle has a total capacity of about 100 ml., with reservoir 10 being tapered at its top to join a 2 inch long capillary neck 12 having an internal diameter of 0.5 mm.-1.5 mm. The volumetric capacity of the reservoir must be at least 1,000 times that of the neck to enable accurate measurement of small trace concentrations of oil. Adjacent the capillary is a filling neck 14 (8 mm. O.D.) extending about 2 mm. above the top of the neck and curving down to within 2.5 inches of the bottom of the reservoir at the vertical axis of the bottle.

The charged analysis bottle is placed in a constant temperature bath for temperature equilibration to over 135° F and preferably to 150° F. A trace oil demulsifier is then added in at least three portions, with the bottle contents being mixed by swirling between additions. The final addition of demulsifier should bring the liquid surface to just below (1 cm.) the bottle neck.

The choice of demulsifier is in part dependent upon the emulsifier used and the nature of the suspected oil. When, the suspected oil has a specific gravity near that of water, the demulsifier should be sufficiently water soluble to yield a substantial increase in specific gravity. Sodium salts of polybasic acids are the preferred demulsifiers, particularly sodium dichromate ($Na_2Cr_2O_7$) or sodium citrate ($Na_3C_6H_5O_7 \cdot 2H_2O$), but also including, e.g., $Na_2HPO_4$, $Na_2MoO_4$, $Na_2SO_4$, $Na_2CO_3$, $Na_2S_2O_3$, and $Na_2CrO_4$. The preferred range of concentration for sodium dichromate is 0.5 to 4.0 Molar, particularly 2.5 Molar. For sodium citrate the preferred range is 0.3 to 1.7 Molar, particularly 0.8 Molar. Preferably a pH indicator (e.g. bromcresol green or purple, or another such well known indicator) is included in the demulsifier formulation in sufficient volume to cause a color change at between pH8 and pH9. The completed formulation should be filtered through acid washed paper.

After addition of the demulsifier the bottle is placed in a centrifuge thermostatically controlled at the water bath temperature. In one example, a centrifuge having a 17 inch head operated at 836 RPM for 8.5 minutes. More of the same demulsifier is then added to the bottle to raise the released oil to form a column entirely within the bottle neck, all while keeping the bottle at the equilibrated temperature. The bottle is then centrifuged again (in the example, for 3 minutes) until the oil water interface (visibility of which will be aided by the pH indicator if present) is clearly defined. After an equilibration period in the constant temperature bath the length of the oil column is carefully measured to the nearest 0.05 mm. and converted to oil concentration by comparison with a standard curve.

For use of the invention standard curves must be prepared for the various oils to be tested on the basis of a series of tests as set forth above, run on known concentrations of the oil to be tested. Each curve should include one data point based on a test with emulsifier but no oil.

Other embodiments are within the following claims:

I claim:

1. The method of trace oil analysis comprising the steps of
    providing an aqueous sample containing oil in concentration no greater than 2,000 ppm,
    mixing said sample with an emulsifier to distribute said oil uniformly through said sample,
    transferring a measured portion of the emulsified sample to a reservoir of a bottle having a capillary neck,
    equilibrating the temperature of said sample portion,
    adding a demulsifier to said bottle, while keeping the liquid level therein below said neck,
    whirling said bottle in a heated centrifuge to separate out said oil,
    adding liquid to said bottle to raise said liquid level to form a column of separated oil wholly within said neck,
    equilibrating the temperature of the contents of said bottle, and
    measuring the length of said column of oil.

2. The method of claim 1 wherein said demulsifier is added in at least three portions with the contents of said bottle being mixed between additions.

3. The method of claim 1 wherein said bottle is whirled in said centrifuge after said column is formed in said neck.

4. The method of claim 1 wherein said capillary neck has an I.D. between 0.5 mm. and 1.5 mm.

5. The method of claim 1 wherein the volumetric ratio of said reservoir to said neck is at least 1,000.

6. The method of claim 1 wherein said demulsifier includes a pH indicator.

7. The method of claim 1 wherein the temperature equilibration steps are carried out in a constant temperature bath at at least 135°.

8. The method of claim 7 wherein said centrifuge is temperature controlled at at least 135°.

9. The method of claim 1 wherein said demulsifier comprises a sodium salt of a polybasic acid.

10. The method of claim 9 wherein said demulsifier is sodium dichromate in a 0.5-4.0 Molar aqueous solution.

11. The method of claim 9 wherein said demulsifier is sodium citrate in a 0.3-1.7 Molar aqueous solution.

12. The method of claim 1 wherein said emulsifier includes a polyethoxylated linear alcohol of the general formula $RO-(CH_2-CH_2O)_n-H$ where $n$ is between 3 and 7, inclusive.

13. The method of claim 12 where R is an alkyl phenyl radical in which the alkyl radical contains 7 to 12 carbon atoms.

14. The method of claim 12 wherein R is an alkyl radical containing 6 to 20 carbon atoms.

15. The method of claim 14 wherein said alkyl radical has from 11 to 15 carbon atoms and $n$ is 3 or 5.

16. The method of claim 12 wherein said emulsifier additionally includes an alkyl or polyalkyl benzene sulfonate or an alkyl or polyalkyl naphthalene sulfonate, where the alkyl or polyalkyl group contains 8 to 24 carbon atoms.

17. The method of claim 16 wherein the volume of said sulfonate is 2 to 7 times that of said alcohol.

18. The method of claim 16 wherein said emulsifier additionally includes sodium dioctyl sulfosuccinate.

* * * * *